US007560413B2

(12) United States Patent
Lok

(10) Patent No.: US 7,560,413 B2
(45) Date of Patent: *Jul. 14, 2009

(54) COPPER-CONTAINING MATERIALS

(75) Inventor: Cornelis Martinus Lok, Wirral (GB)

(73) Assignee: Johnson Matthey PLC, Billingham, Cleveland (GB)

( * ) Notice: Subject to any disclaimer, the term of this patent is extended or adjusted under 35 U.S.C. 154(b) by 678 days.

This patent is subject to a terminal disclaimer.

(21) Appl. No.: 10/759,137

(22) Filed: Jan. 20, 2004

(65) Prior Publication Data
US 2004/0147395 A1 Jul. 29, 2004

Related U.S. Application Data

(60) Division of application No. 09/664,556, filed on Sep. 18, 2000, now Pat. No. 6,703,342, which is a continuation of application No. PCT/GB99/01027, filed on Apr. 1, 1999.

(30) Foreign Application Priority Data
Apr. 3, 1998 (GB) ................................. 9807131.9

(51) Int. Cl.
*B01J 31/00* (2006.01)
(52) U.S. Cl. ...................................... 502/346; 502/415
(58) Field of Classification Search ................. 502/346, 502/415
See application file for complete search history.

(56) References Cited

U.S. PATENT DOCUMENTS

| 1,937,728 | A | | 12/1933 | Storch | |
| 2,696,475 | A | * | 12/1954 | Farrow | 502/335 |
| 3,226,340 | A | | 12/1965 | Stephens | |
| 3,397,154 | A | * | 8/1968 | Talsma | 502/304 |
| 3,928,238 | A | | 12/1975 | Koberstein et al. | |
| 3,945,945 | A | | 3/1976 | Kiovsky et al. | |
| 3,956,475 | A | | 5/1976 | Teichner et al. | |
| 4,493,906 | A | * | 1/1985 | Couvillion | 502/346 |
| 4,582,819 | A | | 4/1986 | Miller et al. | |
| 4,863,894 | A | * | 9/1989 | Chinchen et al. | 502/342 |
| 5,126,310 | A | | 6/1992 | Golden et al. | |
| 5,298,472 | A | | 3/1994 | Wegman et al. | |
| 5,670,444 | A | | 9/1997 | Yoshida et al. | |
| 5,847,131 | A | | 12/1998 | Simon et al. | |
| 5,853,681 | A | | 12/1998 | Denny et al. | |
| 6,048,820 | A | | 4/2000 | Takeuchi et al. | |
| 6,201,160 | B1 | | 3/2001 | Brudermuller et al. | |
| 6,703,342 | B1 | * | 3/2004 | Lok | 502/346 |

FOREIGN PATENT DOCUMENTS

DE  196 24 283  1/1998

* cited by examiner

*Primary Examiner*—Steven Bos
(74) *Attorney, Agent, or Firm*—Jones Day

(57) ABSTRACT

Copper/alumina compositions for use as, e.g., catalysts are made by impregnating a porous transition alumina support with an aqueous solution of a copper ammine carbonate complex, draining off any excess of the impregnating solution, and then heating the impregnated support to a temperature above 80° C. to decompose the complex, thereby depositing a basic copper carbonate compound on the surfaces of the pores of the transition alumina support. After reduction, the composition has a high copper surface area, expressed per unit weight of copper in the composition.

10 Claims, No Drawings

COPPER-CONTAINING MATERIALS

CROSS REFERENCE TO RELATED APPLICATIONS

This application is a divisional application based on U.S. Ser. No. 09/664,556, filed Sep. 18, 2000, now U.S. Pat. No. 6,703,342 which is a continuation of International Application No. PCT/GB99/01027, filed Apr. 1, 1999, which designated the United States. These applications, in their entirety, are incorporated herein by reference.

This invention relates to copper-containing materials. Copper containing compositions, wherein some or all of the copper is in the form of elemental copper, or in the oxide form, i.e. as cupric and or cuprous oxides, or in the form of other copper species, e.g. sulphides, basic carbonates and the like, are widely used in industrial processes as catalysts or sorbents. For example compositions wherein some or all of the copper is in the elemental form are often used as catalysts for reactions involving hydrogen. As examples there may be mentioned the shift reaction wherein carbon monoxide is reacted with steam to form carbon dioxide and hydrogen; alcohol synthesis reactions wherein a mixture of hydrogen and carbon monoxide and/or carbon dioxide is reacted to form methanol or higher alcohols; hydrogenation reactions; and hydrogenolysis of esters. Compositions wherein some or all of the copper is in the form of elemental copper, copper oxides, copper hydroxide or basic copper carbonate, can be used as sorbents for purification of gases and liquids to remove contaminants such as sulphur compounds. Compositions wherein the copper is in the form of copper sulphides can be used as sorbents for the removal of contaminants such as arsenic compounds and mercury from gases and liquids.

For such applications it is generally desirable that the copper species is present in a highly dispersed form so that the active species is readily contacted with the reactants or material being treated. The degree of dispersion of the copper species can be assessed by determining the exposed surface area of the copper (after reduction of the copper species to elemental copper) per gram of copper. A high copper surface area per gram of copper implies a high degree of dispersion. The copper surface area is conveniently determined by the nitrous oxide decomposition method, for example as described by Evans et al in "Applied Catalysis", 7, (1983), pages 75-83 — a particularly suitable technique is described in EP 0 202 824.

It is known that compositions having, upon reduction, a high metal surface area per gram of metal may be made by impregnating a transition alumina support with a metal ammine carbonate solutions, followed by heating to decompose the ammine carbonate. Thus EP 0 092 878 describes the production of nickel on alumina compositions and WO 96 04 072 describes the production of the analogous cobalt compositions. However, the degree of dispersion of a metal obtained by impregnation of a support, such as alumina, with a solution of a salt or complex of the metal, depends on the ease of decomposition of the complex or on the solubility of the salt. If the salt is too soluble or the complex is too stable, agglomerates of the metal species are liable to be formed rather than a thin layer of the decomposition products upon the surfaces of the pores of the alumina support. Such agglomerates will give, upon reduction to the metal, materials having a relatively low metal surface area. The nickel and cobalt ammine carbonate complexes as employed in the aforesaid EP 0 092 878 or WO 96 04 072 have a relatively low stability. Thus they decompose very readily.

We have found that although copper ammine carbonate complexes are significantly different and are far more stable than the cobalt or nickel analogues, surprisingly high surface area copper materials can be obtained by this route. Whereas cobalt and nickel form hexa-ammine complexes, copper forms tetra-ammine complexes. The complex constants for the copper, cobalt and nickel ammonia complexes are as follows:

|  |  | Co | Ni | Cu |
|---|---|---|---|---|
| $K_1$ | $M(NH_3)_1$ | 130 | 630 | 14000 |
| $K_2$ | $M(NH_3)_2$ | 43 | 170 | 3200 |
| $K_3$ | $M(NH_3)_3$ | 11 | 54 | 780 |
| $K_4$ | $M(NH_3)_4$ | 6 | 16 | 135 |
| $K_5$ | $M(NH_3)_5$ | 2 | 6 | — |
| $K_6$ | $M(NH_3)_6$ | 0 | 1 | — |

As the composition is heated to decompose the ammine complex, the cobalt and nickel materials precipitate readily when only some of the ammonia has been driven off. On the other hand, on heating the copper complexes, since they are much more stable, it would be expected that the copper would remain longer in solution during evaporation of the water and ammonia and would be liable to be deposited unevenly at the locations where the last of the water is removed, and hence give rise to aggregates of the copper composition rather than as the desired thin coating on the pores of the alumina support. Indeed, in EP 0 259 911 it was proposed to make metal/alumina catalysts by combining an ammoniacal solution of a salt such as a carbonate of the metal with an aqueous solution of an aluminium compound and heating the mixture to boiling, or near boiling, to precipitate a mixed basic carbonate of the metal and aluminium. Whereas this method gave compositions which, when reduced, had a high metal surface area per gram of metal when the metal was nickel, the metal surface area was only 1-20 m² per gram of metal when the metal was copper.

Accordingly the present invention provides a process for the manufacture of a composition comprising a copper compound supported on a porous transition alumina comprising impregnating a porous transition alumina support with an aqueous solution of a copper ammine carbonate complex, draining off any excess of the impregnating solution, and then heating the impregnated support to a temperature above 80° C. to decompose the complex thereby depositing a basic copper carbonate compound on the surfaces of the pores of the transition alumina support.

The transition alumina may be of the gamma-alumina group, for example a eta-alumina or chi-alumina. These materials may be formed by calcination of aluminium hydroxides at 400-750° C. and generally have a BET surface area in the range 150-400 m²/g. Alternatively, the transition alumina may be of the delta-alumina group which includes the high temperature forms such as delta- and theta- aluminas which may be formed by heating a gamma group alumina to a temperature above about 800° C. The delta-group aluminas generally have a BET surface area in the range 50-150 m²/g. The transition aluminas contain less than 0.5 mol of water per mole of $Al_2O_3$, the actual amount of water depending on the temperature to which they have been heated. The support should be porous, preferably having a pore volume of at least 0.2 ml/g, particularly in the range 0.3 to 1 ml/g.

The support may be in powder form, but is preferably in the form of shaped units, for example approximate spheres, pellets, cylindrical tablets, agglomerates. The shaped units preferably have a minimum dimension of at least 1 mm, and preferably have maximum and minimum dimensions in the range 1 to 15 mm, preferably 3 to 10 mm. The maximum dimension is preferably not more than 3 times the minimum dimension. Where a powdered alumina is employed, the alumina preferably has a surface-weighted mean diameter in the range 1 to 100 μm. [The term surface-weighted mean diameter D[3,2], otherwise termed the Sauter mean diameter, is defined by M. Alderliesten in the paper "A Nomenclature for Mean Particle Diameters"; Anal. Proc., vol 21, May 1984, pages 167-172, and is calculated from the particle size analysis which may conveniently be effected by laser diffraction for example using a Malvern Mastersizer]. Alternatively the support may be in the form of a monolith, e.g. a honeycomb. In the latter case, the honeycomb may be formed from a ceramic or metal support with a coating of the transition alumina.

The amount of the copper ammine carbonate complex employed is preferably such that the composition has a copper to aluminium atomic ratio in the range 0.025 to 0.5, corresponding to a copper content, in a binary copper species/alumina composition, (after reduction of the copper species to elemental copper) of about 3 to 40% by weight.

The shaped units of the invention may be made by impregnating the support with an aqueous solution of a copper ammine carbonate complex and, after draining off any excess of impregnation solution, then heating the impregnated support to decompose the copper ammine carbonate complex. Heating at temperatures above about 80° C. is sufficient to decompose the copper ammine carbonate, with the evolution of ammonia and carbon dioxide, to give a basic copper carbonate. Heating at temperatures above about 200° C., particularly above about 250° C., will cause the basic copper carbonate to decompose to give a copper oxide species. The basic copper carbonate species, or the copper oxide species, can be converted to other copper species such as elemental copper by reduction or to copper sulphide by sulphiding with a suitable sulphur compound, e.g. hydrogen sulphide or a solution of an alkali or ammonium sulphide or polysulphide as is known in the art.

The copper ammine carbonate solution may be made by dissolving basic copper carbonate in an aqueous solution of ammonium carbonate containing additional ammonium hydroxide. The relative amounts should be such that the pH of the solution is in the range 7-12, preferably 8-11. The solution preferably contains 1-5, particularly 2-4, especially 1.5-2.5 moles of the copper complex per litre. As the concentration of copper increases, then generally the proportion of carbonate ions relative to hydroxide ions in the basic copper carbonate feed should be increased.

Where the transition alumina is in the form of shaped units, the shaped units may be given multiple impregnations with the copper ammine carbonate solution with heating between impregnations to effect decomposition of the copper ammine carbonate. By this method, a thin layer of the hydroxycarbonate is deposited on the surfaces of the pores of the transition alumina shaped units. On the other hand, where the alumina is employed in powder form, the transition alumina powder may be slurried with the appropriate amount of an aqueous solution of the copper ammine carbonate complex to give a product of the desired copper content. The alumina carrying the deposited copper compound is then filtered from the aqueous medium and heated. The resultant product may then be formed into shaped units, e.g. pelleted, if desired.

If it is desired to have the copper species in the form of the oxide, the product may be calcined at a temperature in the range 200-500° C., particularly 250-450° C. In some cases where the oxide is desired and transition alumina shaped units are given multiple impregnations, it may be desirable to calcine the impregnated material between impregnations. Where it is desired to have the copper in the form of elemental metal, the dried impregnated supports may be reduced directly with a suitable reductant, e.g. hydrogen, preferably diluted with an inert gas, at a temperature in the range 150-400° C., particularly 200-300° C. Alternatively the reduction may be effected after conversion of the deposited copper hydroxycarbonate to copper oxide by calcination.

Conversion of the copper metal, copper oxide or copper hydroxycarbonate to other copper species, e.g. sulphides, may be effected by known procedures.

Depending on the pore volume of the support, and the concentration of the impregnating solution employed, it is possible to produce compositions containing an amount of the copper species varying over a wide range. For example compositions having a copper species content in the range 3 to 40% by weight, expressed as copper, based on the combined weights of the transition alumina and the copper species, may be produced. For compositions having a copper to aluminium atomic ratio above about 0.09, corresponding to a copper content, in a binary copper species/alumina composition, (after reduction of the copper species to elemental copper) of about 10% by weight, multiple impregnations may be required. On reduction of the copper species, e.g. by hydrogen at temperatures ranging from 150-250° C., compositions having a copper surface area above 40 $m^2$ per gram of copper may be obtained. Preferably the copper surface area is above 50 $m^2$, particularly above 60 $m^2$, per gram of copper.

Certain compositions of a copper species on a support of transition alumina containing substantial amounts of the copper species and having, upon reduction of the copper species, a high copper surface area per gram of copper are new.

Thus copper compositions obtained by impregnating gamma-alumina powder with copper nitrate followed by drying and calcination are described by Robinson et al in "Applied Catalysis", 44, (1988), pages 165-177. FIG. 5 of this paper indicates that the maximum copper surface area, per gram of unreduced catalyst, was about 9 $m^2/g$ and was given by a composition containing about 8% by weight copper (Cu/Al atomic ratio about 0.07). This corresponds to a copper surface area of about 112 $m^2$ per gram of copper. However at higher copper contents, the copper surface area decreased. Thus at a copper content of about 24% by weight (Cu/Al atomic ratio about 0.25) the surface area was about 3 $m^2$ per gram of unreduced catalyst, i.e. a copper surface area of about 12.5 $m^2$ per gram of copper.

It is desirable to produce copper compositions having, upon reduction of the copper species, a high copper surface area per gram of copper, and at the same time having substantial copper contents.

In "ACS Division of Fuel Chemistry", 29, No 5, (1984), pages 178-188, Chinchen et al list copper/alumina catalysts for methanol synthesis having copper contents of 20%, 40% and 60% having a copper surface areas of 11.7, 19.9 and 12.7 $m^2$ per gram of unreduced catalyst respectively, corresponding to copper surface areas of about 58.5 $m^2$, 49.8 $m^2$ and 21.2 $m^2$ per gram of copper. The method of production of these copper/alumina catalysts is not mentioned, but since they are compared with conventional copper/zinc oxide/alumina methanol synthesis catalysts they were presumably made by co-precipitation as is normal for methanol synthesis catalysts, and not by impregnating a preformed transition alumina support.

Copper catalysts having a copper surface area above 35 $m^2$ per gram of copper are described in U.S. Pat. No. 5,302,569.

These are prepared by coprecipitation of copper, zinc and aluminium compounds as e.g. carbonates followed by calcination. The proportion of alumina in the calcined catalysts is relatively small, ranging from 2 to 50 parts by weight per 100 parts by weight of copper oxide in the calcined composition. The examples describe the production of compositions which have, upon reduction, copper surface areas ranging from 54 to 76 $m^2$ per gram of copper.

Copper catalysts having greater copper surface areas, above 70 $m^2$ per gram of copper, are described in U.S. Pat. No. 4,863,894. Those catalysts were made by co-precipitation of copper compounds with zinc and, optionally, aluminium compounds as basic carbonates and then reducing the copper species to the elemental form without heating the basic carbonate composition to temperatures above 200° C. However such a technique imposes difficulties in obtaining the catalyst in a suitable physical form. Thus pelleting of the basic carbonate composition gives rise to products of low strength upon reduction, while pelleting after reduction requires that the pelleting has to be effected in an inert atmosphere. The catalysts of this reference contain only a minor amount, if any, of alumina, but a significant amount of zinc and/or magnesium.

In the present invention it is preferred that the compositions have a substantial copper contents but also contain, after reduction, at least 60% by weight of alumina, and are preferably essentially free from compounds of zinc and magnesium, and have, upon reduction of the copper species, a high copper surface area per gram of copper. The compositions are preferably in the form of shaped units suitable for use as fixed bed catalysts or sorbents.

Accordingly the present invention further provides a composition comprising a copper species and porous transition alumina, preferably in the form of support units having a minimum dimension of at least 1 mm, said composition having a copper to aluminium atomic ratio in the range 0.14 to 0.5 and having, upon reduction of the copper species with hydrogen at 250° C., a copper surface area of at least 60 $m^2$, preferably at least 80 $m^2$, per gram of copper.

The composition preferably has a BET surface area above 80 $m^2$/g. Preferably the copper to aluminium atomic ratio is at least 0.16.

The products of the invention may be used as catalysts or adsorbents. With the copper species in the reduced form, they are of use as catalysts for reactions involving hydrogen. For such use in some cases it may be desirable to impregnate the product with a noble metal such as platinum, palladium, or rhodium. With the copper species in the hydroxycarbonate or oxide form they are of use in the purification of gases and liquids by the removal of sulphur compounds. With the copper species in the form of a sulphide, they are of use as absorbents for the removal of impurities such as mercury and arsines from gas and liquid streams.

The invention is illustrated by the following examples.

EXAMPLE 1

An impregnation solution was prepared by dissolving 250 g of ammonium carbonate in 600 ml of aqueous ammonium hydroxide (strength 35%, specific gravity 0.88) and then slowly adding. 244 g of basic copper carbonate, (55% by weight Cu, $CuCO_3/Cu(OH)_2$ weight ratio 1.2) with stirring at room temperature until dissolved. The solution was then filtered.

200 g of gamma alumina extrudates (support S-A) of 3 mm length and 1.2 mm diameter having a BET surface area (A) of 294 $m^2$/g, a pore volume ($V_p$ as derived from the desorption branch of the nitrogen physisorption isotherm at 0.98 relative pressure) of 0.65 ml/g and an average pore diameter ($4V_p/A$) of 88 Å, were immersed in 400 ml of the impregnation solution at room temperature. The impregnated extrudates were then filtered from the excess of the solution and dried overnight at 120° C. This dried material was designated product 1-A-1.

150 g of product 1-A-1 was then immersed for 10 minutes in 300 ml of the impregnation solution and then the excess solution was removed by filtration. The re-impregnated material was dried overnight at 120° C. to give product 1-A-2.

100 g of product 1-A-2 was then immersed for 10 minutes in 200 ml of the impregnation solution and then the excess solution was removed by filtration. The re-impregnated material was dried overnight at 120° C. to give product 1-A-3. Part of product 1-A-3 was calcined in air at 300° C. for 2 hours to give product 1-A-3c.

EXAMPLE 2

The procedure of Example 1 was repeated but using extrudates (support S-B) of 3 mm length, 1.2 mm diameter of theta-alumina having a BET surface area of 111 $m^2$/g, 0.45 ml/g pore volume and an average pore diameter (4V/A) of 163 Å as the support. The products were designated 2-B-1, 2-B-2, 2-B-3 and 2-B-3c.

EXAMPLE 3

The procedure of Example 2 was repeated but using a slightly less concentrated copper complex solution, thus 700 ml of ammonium hydroxide of 30% strength was used in place of the 600 ml of ammonium hydroxide of strength 35%. Also the dried material was calcined at 300° C. after each impregnation. The product, after three impregnations with calcination after each impregnation, was designated 3-B-3c.

EXAMPLE 4

Example 1 was repeated using gamma-alumina extrudates (support S-C) of 3 mm length and 1.2 mm diameter having a BET surface area of 248 $m^2$/g, a pore volume of 0.77 ml/g and an average pore diameter (4V/A) of 120 Å as the support. The dried material, after two impregnation steps, was designated 4-C-2. The dried and calcined material after the third impregnation was designated 4-C-3c.

EXAMPLE 5

Example 4 was repeated but the support was given four impregnations with drying at 120° C. after each impregnation. The final uncalcined material was designated 5-C4.

Samples of some of the products were analysed by XRF and the copper surface area of some of the products was determined by nitrous oxide chemisorption. Reduction of the samples was effected prior to copper surface area determination by heating the sample at a rate of 200 K/h in a current of hydrogen diluted with argon (67% $H_2$/33% Ar by volume) to a temperature of 393 K (120° C.) maintaining at this temperature for 30 min, then increasing the temperature at a rate of 100 K/h to the desired reduction temperature, and maintaining at that desired temperature for 1 h. After reduction, the sample was cooled to 90° C. at which temperature the nitrous oxide chemisorption was effected using a mixture of nitrous oxide and argon (1% $N_2O$/99% Ar by volume). It was assumed that the adsorption stoichiometry of $Cu_s/O_{ads}$ was 2 and that the area occupied by one copper atom is 5.18 Å$^2$, i.e. at a 73% packing density, 1.46×10$^{19}$ surface copper atoms per m$^2$.

The results are shown in the following table.

| | Cu (% wt) | BET surface area (m$^2$/g) | Copper surface area (m$^2$ per g of copper) at a reduction temperature of | | |
|---|---|---|---|---|---|
| | | | 150° C. | 200° C. | 250° C. |
| S-A | 0.0 | 294 | | | |
| 1-A-1 | 12.1 | 238 | | 96.7 | |
| 1-A-2 | 17.1 | 230 | | | |
| 1-A-3 | 18.8 | 198 | | | |
| 1-A-3c | 20.7 | 218 | 81.2 | 90.8 | 87.4 |
| S-B | 0.0 | 111 | | | |
| 2-B-1 | 9.0 | 90 | | | |
| 2-B-2 | 12.8 | 97 | | | 80.5 |
| 2-B-3 | 15.1 | 108 | | | |
| 2-B-3c | 15.5 | 99 | 60.6 | 77.4 | 82.6 |
| 3-B-3 | 14.1 | — | | | |
| 3-B-3c | 14.5 | — | | | 94.8 |
| S-C | 0.0 | 248 | | | |
| 4-C-2 | 14.4 | — | | | 75.6 |
| 4-C-3c | 18.4 | — | | | 74.3 |
| 5-C-4 | 22.0 | 170 | | | 42.3 |

The copper content is the copper species content of the unreduced catalyst, expressed as elemental copper.

EXAMPLE 6

The uncalcined sample 5-C-4 was tested for its ability to absorb mercaptans from a gas stream. 30 ml of the unreduced material was charged to a reactor tube of 25 mm diameter to form an absorbent bed. Methane, containing 20 ppm by volume of propyl mercaptan, was passed down through the bed at atmospheric pressure at 25° C. at a rate of 14 litres per hour, i.e. a space velocity of 467 h$^{-1}$, and the effluent analysed for sulphur-containing compounds. For a period of 450 hours no sulphur compounds were detected in the effluent (detection limit 0.5 ppm by volume), indicating total sulphur removal.

In order to accelerate the testing, the propyl mercaptan content of the feed gas was then increased to 100 ppm by volume and the testing continued. After an additional 235 hours run time 6 ppm by volume of dipropyl disulphide was detected in the exit gas stream. After a further 221 hours testing, the dipropyl disulphide content had increased to 35 ppm by volume. At this stage the feed was replaced by nitrogen at the same flow rate. During the subsequent 1054 hours dipropyl sulphide was gradually desorbed from the absorbent bed until the sulphur level in the effluent decreased to less than 2 ppm by volume. At no time while either the methane containing propyl mercaptan or nitrogen was being fed, was propyl mercaptan detected in the exit gas stream. The absorbent bed was then discharged and analysed for the total sulphur level. The top 10 ml of the absorbent bed had an average sulphur content of 4.41% by weight, the middle 10 ml had an average sulphur content of 3.12% by weight and the bottom 10 ml had an average sulphur content of 0.99% by weight.

This shows that in addition to absorbing propyl mercaptan, the material was also effective to catalyse the dimerisation of propyl mercaptan.

EXAMPLE 7 (COMPARATIVE)

A nickel analogue, containing about 14.5% by weight nickel, of the material 2-B-3 was made by a similar route. After calcination and reduction at 420° C., it had a nickel surface area in the range 150-160 m$^2$ per gram of nickel. The uncalcined material was tested as in Example 6 except that the propyl mercaptan content was 100 ppm by volume throughout. Total sulphur removal was achieved for only 231 hours, and thereafter both propyl mercaptan and dipropyl disulphide were detected in the effluent at levels of 37 ppm by volume and 21 ppm by volume respectively. After a total run time of 330 hours, the system was purged with nitrogen it took 189 hours purging to desorb the sulphur compounds from the absorbent to give a sulphur content of the effluent below 2 ppm by volume. Analysis of the 10 ml portions of the absorbent gave average sulphur contents of 0.92% (top), 0.87% (middle), and 0.83% (bottom), all by weight.

It is seen by comparison with Example 6, that the nickel analogue was far less effective than the copper-containing material.

EXAMPLE 8 (COMPARATIVE)

To assess the effectiveness of a transition alumina alone, the procedure of Example 6 was repeated using gamma alumina spheres of diameter in the range 3.3 to 4.7 mm and having a surface area of 300 m$^2$/g and using methane containing 20 ppm by volume of propyl mercaptan. After only 17 hours the effluent contained 10 ppm by volume of propyl mercaptan. The system was then purged with nitrogen for 24 hours. Analysis of the 10 ml portions of the absorbent gave average sulphur contents of 0.04% (top), 0.03% (middle), and 0.03% (bottom), all by weight, showing that the alumina was not effective as an absorbent for propyl mercaptan.

The invention claimed is:

1. A composition comprising a copper species coated on a porous transition alumina, said composition having a copper to aluminum atomic ratio in the range 0.14 to 0.5 and having, upon reduction of the copper species with hydrogen at 250° C., a copper surface area of at least 60m$^2$ per gram of copper, wherein said transition alumina has a pore volume in the range of 0.45 to 1.0 ml/g.

2. A composition according to claim 1 having a BET surface area above 80m$^2$/g.

3. presented) A composition according to claim 1 having a copper to aluminum atomic ratio of at least 0.16.

4. A composition according to claim 1, wherein the composition, following reduction, contains at least 60 wt. % of alumina.

5. A composition according to claim 1, wherein the composition is essentially free from compounds of zinc and magnesium.

6. A composition according to claim 1, wherein the composition has, upon reduction of the copper species with hydrogen at 250° C., a copper surface area of at least 80 m$^2$ per gram of copper.

7. A composition according to claim 1, wherein the composition is in the form of shaped units suitable for use as fixed bed catalysts or sorbents.

8. A composition according to claim 7, wherein each shaped unit is at least 1 mm in size.

9. A composition according to claim 8, wherein each shaped unit is 1-15 mm in size.

10. A composition according to claim 1, wherein the alumina is in the form of a powder having a surface-weighted mean diameter of 1-100 microns.

* * * * *